United States Patent
Chan et al.

(10) Patent No.: US 8,684,674 B2
(45) Date of Patent: Apr. 1, 2014

(54) ANTI-ROTATION SHROUD FOR TURBINE ENGINES

(75) Inventors: George Joe-Kueng Chan, Salem, MA (US); Victor Hugo Silva Correia, Milton Mills, NH (US)

(73) Assignee: General Electric Company, Schenectady, NY (US)

( * ) Notice: Subject to any disclaimer, the term of this patent is extended or adjusted under 35 U.S.C. 154(b) by 795 days.

(21) Appl. No.: 12/915,223

(22) Filed: Oct. 29, 2010

(65) Prior Publication Data

US 2012/0107107 A1    May 3, 2012

(51) Int. Cl.
| F04D 29/24 | (2006.01) |
| F01D 11/00 | (2006.01) |
| F01D 11/08 | (2006.01) |
| F01D 25/24 | (2006.01) |
| F01D 25/28 | (2006.01) |

(52) U.S. Cl.
CPC ............ *F01D 11/001* (2013.01); *F01D 11/003* (2013.01); *F01D 11/08* (2013.01); *F01D 25/246* (2013.01); *F01D 25/28* (2013.01); *F05D 2240/11* (2013.01); *F05D 2240/14* (2013.01); *F05D 2260/30* (2013.01); *F05D 2260/36* (2013.01)
USPC ........ 415/139; 415/189; 415/209.2; 415/119; 416/190

(58) Field of Classification Search
CPC ..... F01D 11/001; F01D 11/003; F01D 11/08; F01D 25/246; F01D 25/28; F05D 2240/11; F05D 2240/14; F05D 2260/30; F05D 2260/36
USPC ............. 415/135, 119, 139, 189, 190, 209.2, 415/209.3, 209.4; 416/190
See application file for complete search history.

(56) References Cited

U.S. PATENT DOCUMENTS

| 3,365,173 | A | * | 1/1968 | Lynch et al. ............... 415/209.3 |
| 4,596,116 | A | * | 6/1986 | Mandet et al. ................ 415/178 |
| 4,621,976 | A |   | 11/1986 | Marshall et al. |
| 4,687,413 | A | * | 8/1987 | Prario .......................... 415/190 |
| 4,856,963 | A | * | 8/1989 | Klapproth et al. ............ 415/190 |
| 4,907,944 | A | * | 3/1990 | Kroger et al. .............. 415/209.3 |
| 5,188,507 | A |   | 2/1993 | Sweeney |
| 5,846,050 | A | * | 12/1998 | Schilling ....................... 415/135 |
| 6,296,443 | B1 | * | 10/2001 | Newman et al. ........... 415/209.2 |

FOREIGN PATENT DOCUMENTS

| EP | 0980963 A2 | 2/2000 |
| EP | 2006491 A1 | 12/2008 |

OTHER PUBLICATIONS

PCT Search Report and Written Opinion from corresponding Application No. PCT/US2011/054723 dated Nov. 23, 2011.

* cited by examiner

*Primary Examiner* — Igor Kershteyn
(74) *Attorney, Agent, or Firm* — Global Patent Operation; Vivek P. Shankam (57) ABSTRACT

A shroud for turbine engines. The shroud has an integrated anti-rotation device that prevents circumferential movement of the shroud during normal engine operation, and which allows for circumferential installation in split annular case designs. Since the anti-rotation device is an integral part of the shroud and/or annular split turbine case, no additional parts are necessary for assembly or disassembly. Moreover, existing annular split turbine cases can be reworked to accept the anti-rotation device and yet still be backwards compatible with original shroud designs.

7 Claims, 12 Drawing Sheets

ANTI-ROTATION SHROUD FOR TURBINE ENGINES

BACKGROUND OF THE INVENTION

1. Field of the Invention

The field of the invention relates to turbine engines generally, and more particularly to certain new and useful advances in anti-rotation features for turbine shrouds, of which the following is a specification, reference being had to the drawings accompanying and forming a part of the same.

2. Description of Related Art

Turbine engines comprise an airfoil attached to a rotor that rotates about a predetermined axis of rotation. An annular shroud is circumferentially positioned about and spaced apart from the airfoil. An annular split turbine case is circumferentially positioned about and coupled with the shroud. Additionally, an anti-rotation device is added and coupled with the shroud to prevent the shroud from rotating during normal engine operations. However, this anti-rotation device is an extra part that must be installed, disassembled and/or maintained in addition to other components of the turbine engine.

BRIEF SUMMARY OF THE INVENTION

The present disclosure describes embodiments of an improved shroud for turbine engines with 180 degree split turbine casings. The shroud has an integrated anti-rotation device that prevents circumferential movement of the shroud during normal engine operation, and which allows for circumferential installation. Since the anti-rotation device is an integral part of the shroud, no additional parts are necessary for assembly or disassembly. Moreover, existing turbine cases can be reworked to accept the anti-rotation device and yet still be backwards compatible with original shroud designs.

Other features and advantages of the disclosure will become apparent by reference to the following description taken in connection with the accompanying drawings.

BRIEF DESCRIPTION OF THE SEVERAL VIEWS OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Figure 1:
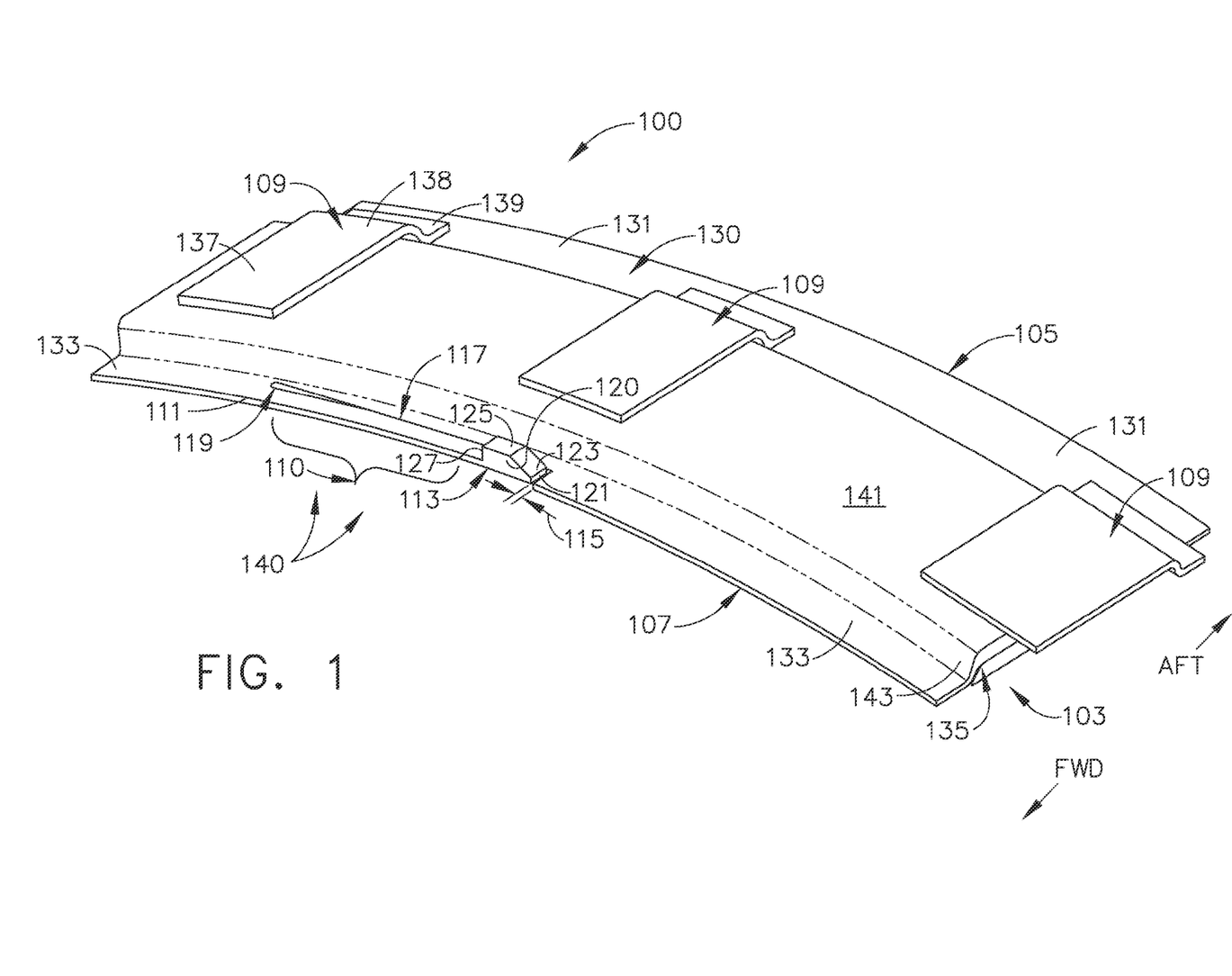
FIG. 1 is a perspective view of a portion of an improved turbine shroud configured for use in a turbine engine.
Figure 2:
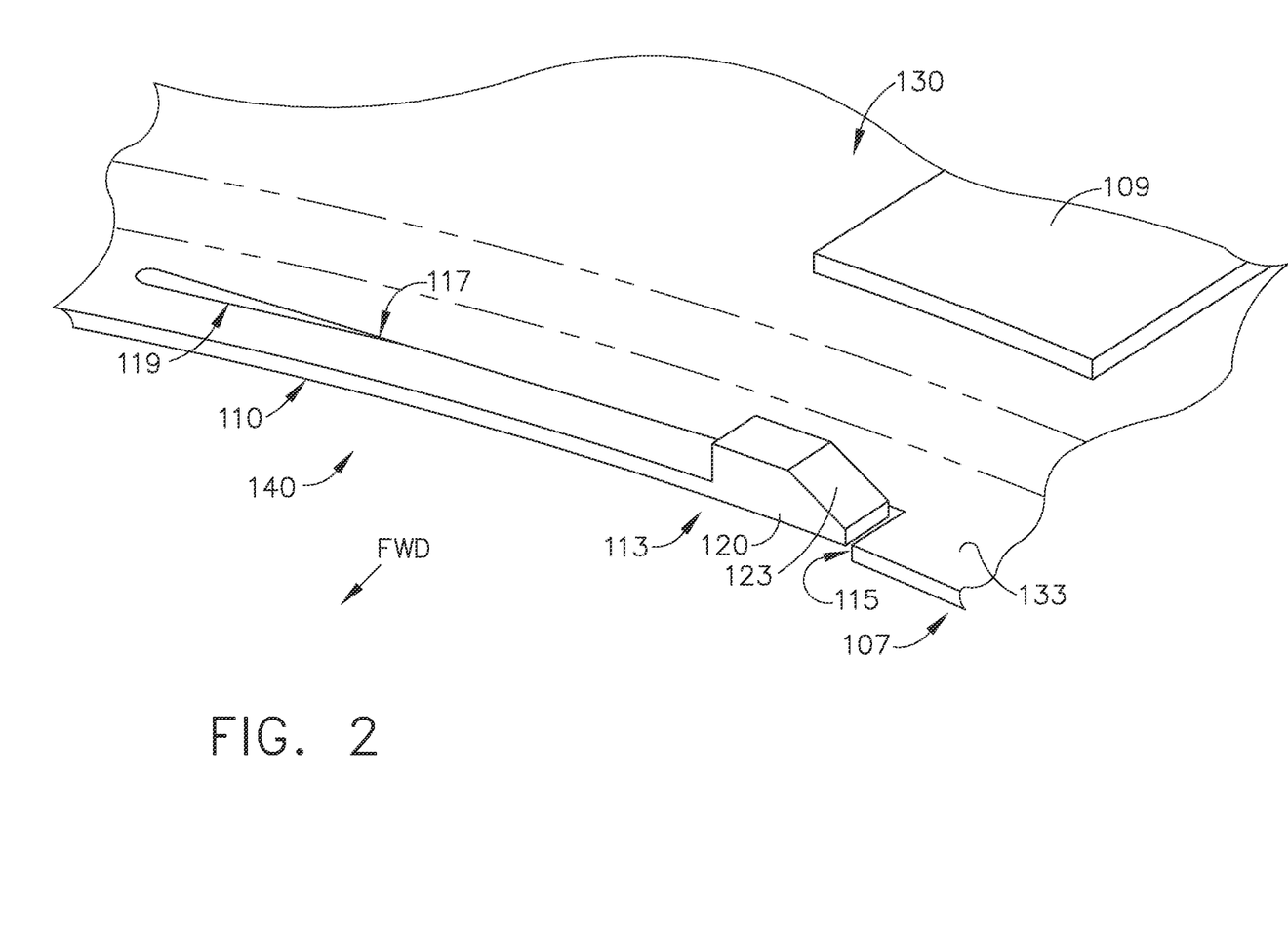
FIG. 2 is a partial, close-up view of an anti-rotation device integrally formed with the improved turbine shroud of FIG. 1.
Figure 3:
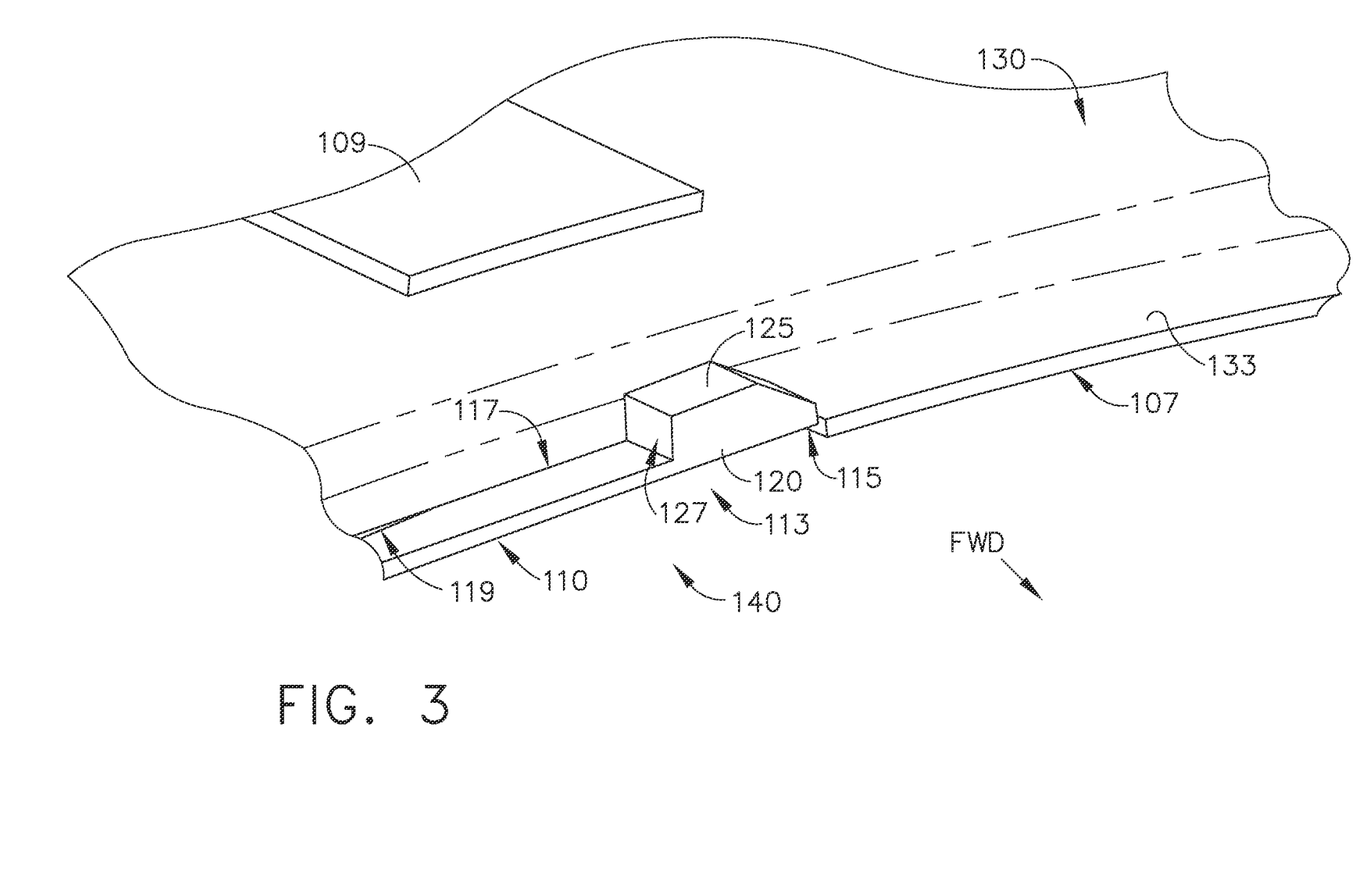
FIG. 3 is another partial, close-up view of the anti-rotation device of FIG. 2.
Figure 4:
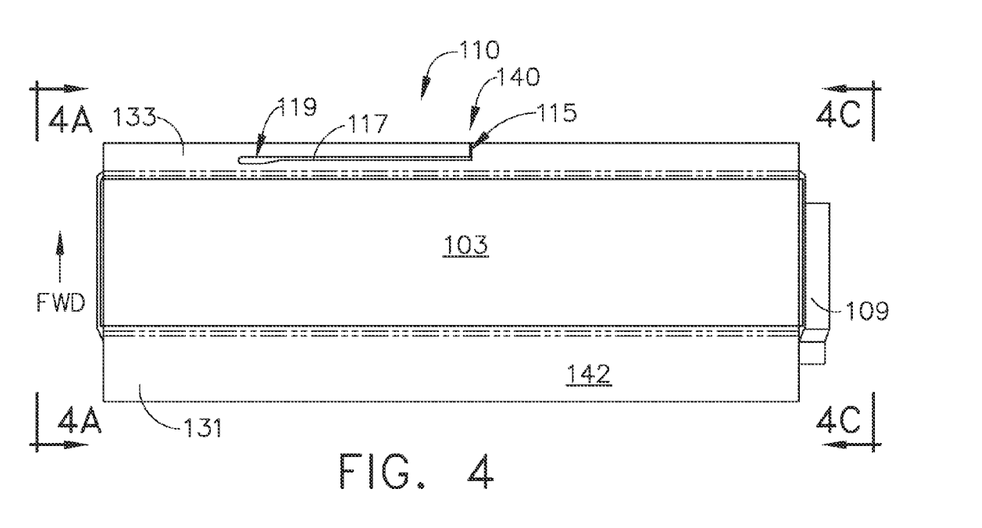
FIG. 4 is a plan view of an interior surface of the improved turbine shroud of FIG. 1.
Figure 4A:
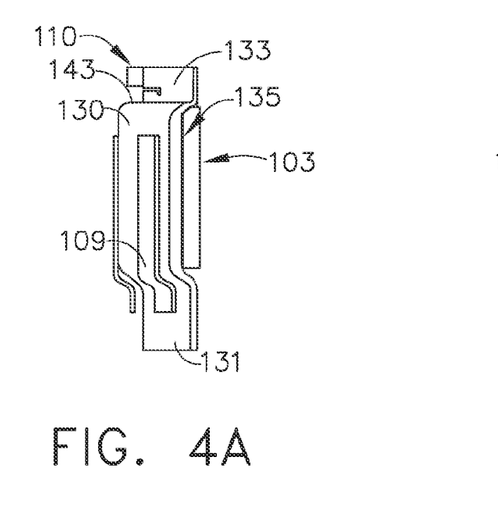
FIG. 4A is an end view of the improved turbine shroud of FIGS. 1 and 4.
Figure 4B:
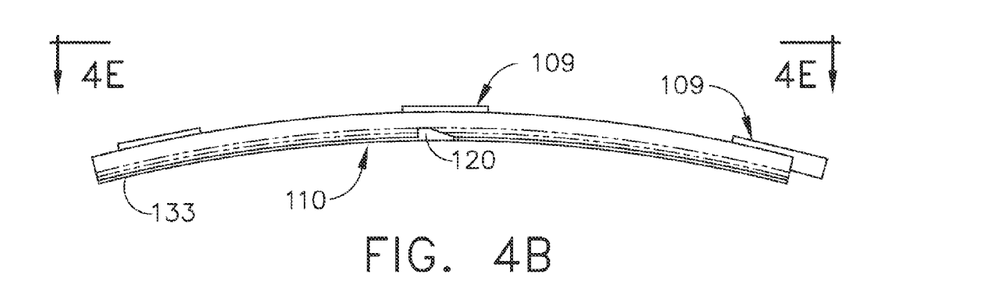
FIG. 4B is a forward side view of the improved turbine shroud of FIGS. 1 and 4.
Figure 4C:
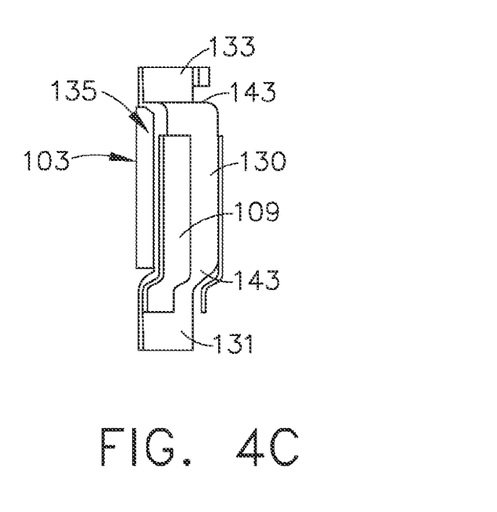
FIG. 4C is another end view of the improved turbine shroud of FIGS. 1 and 4.
Figure 4D:
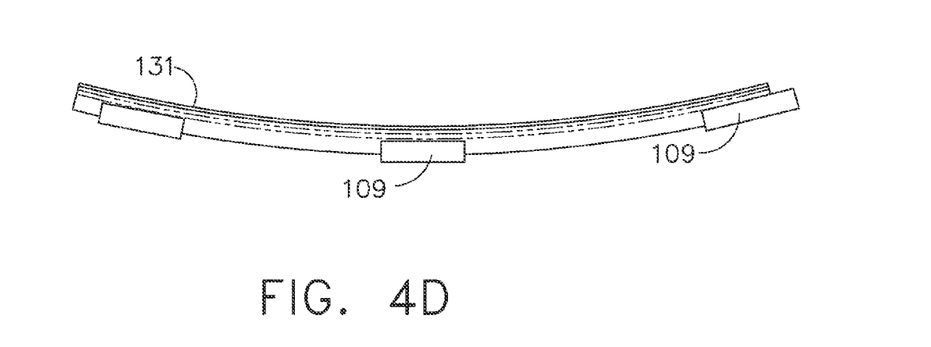
FIG. 4D is an aft side view of the improved turbine shroud of FIGS. 1 and 4.
Figure 4E:
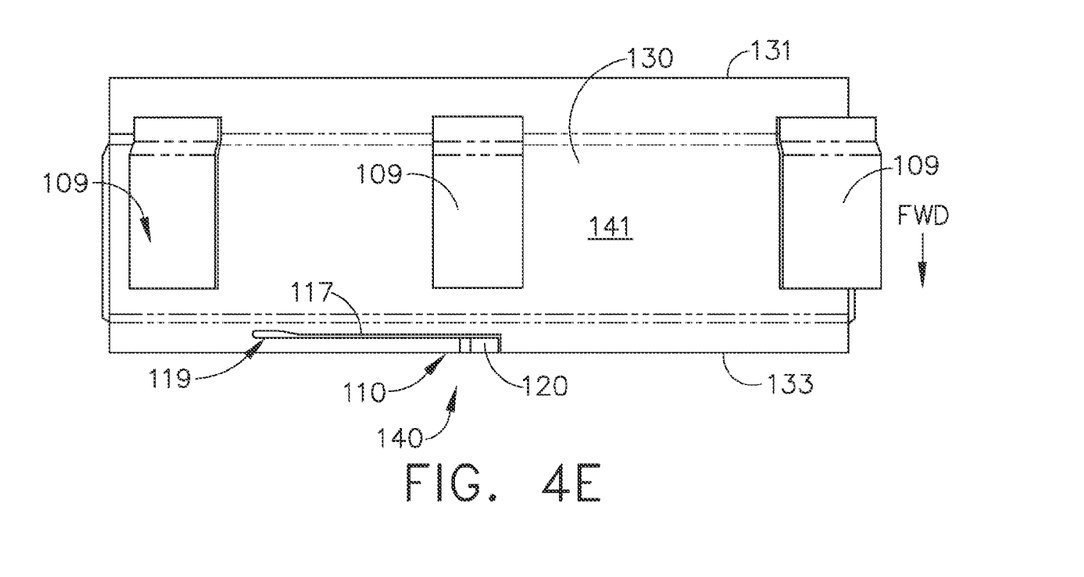
FIG. 4E is a plan view of a back surface of the improved turbine shroud of FIGS. 1 and 4.

FIG. 1 is a perspective view of a portion of an improved turbine shroud 100 configured for use in a turbine engine. FIG. 2 is a partial, close-up view of an anti-rotation device 140 integrally formed with the improved turbine shroud 100 of FIG. 1. FIG. 3 is another partial, close-up view of the anti-rotation device 140 of FIG. 2. FIG. 4 is a plan view illustrating an interior surface 142 of the improved turbine shroud 100 of FIG. 1. FIG. 4A is an end view of the improved turbine shroud 100 of FIGS. 1 and 4. FIG. 4B is a forward side view of the improved turbine shroud 100 of FIGS. 1 and 4. FIG. 4C is another end view of the improved turbine shroud 100 of FIGS. 1 and 4. FIG. 4D is an aft side view of the improved turbine shroud 100 of FIGS. 1 and 4. FIG. 4E is a plan view illustrating shroud backing surface 141 of the improved turbine shroud 100 of FIGS. 1 and 4.

Referring to FIGS. 1, 2, 3, 4, 4A, 4B, 4C, 4D, and 4E, the improved turbine shroud 100 (hereinafter "shroud 100") has an annular shape, although only a portion thereof is shown in the Figures for ease of illustration and description. As persons skilled in the aircraft engine and power generation fields will appreciate, the improved turbine shroud 100 is a component of a turbine engine. When installed in a turbine engine, the improved turbine shroud is spaced slightly apart from and positioned coaxially around an airfoil that is attached to a rotor. When the rotor rotates at a high speed about a predetermined central axis of rotation, the airfoil spins at high speeds within the annulus formed by the assemblage of the improved turbine shroud, which is supported by a split annular turbine case that is positioned coaxially around it.

The shroud 100 comprises several sections: a body 130 and two rails connected therewith—an aft rail 131 and a forward rail 133. As used herein, the term "aft" refers to a downstream portion of a turbine engine, and the term "forward" (also, "fwd") refers to an upstream portion of a turbine engine. The aft rail 131 has an aft edge 105. The forward rail 133 has a forward edge 107. As shown in FIGS. 1, 4A and 4C, the body 130 has a cavity 135 on its interior surface 142. The cavity 135 is an indented portion of the body 130 between sidewalls 143 that connect the aft rail 131 and the forward rail 133 with the body 130. Consequently, the shroud backing surface 141 of the body 130 occupies a different plane than the aft rail 131 and the forward rail 133. The cavity 135 is configured to contain an open-faced honeycomb core 103. The honeycomb core is comprised of corrugated sheet metal ribbon which is formed into hexagonal (6 sided) cells of a uniform size arranged in a staggered formation, where each cell is surrounded by 6 adjacent cells that share a common wall with one another. The honeycomb core 103 is connected to cavity 135 through a metal braze operation. This honeycomb structure provides a dual function; the first is to provide a sacrificial material to prevent damage to the turbine airfoil in the event of rub/contact/incursion between the rotating and static components of the engine during operation; and second to maintain a small tip clearance between the static and rotating components thus improving the engine performance by reducing flowpath air leakage around the tip of the airfoil.

One or more supports 109, or ship laps, are coupled with the shroud backing surface 141 of the body 130 and the aft rail 131. Each support 109 has a base 137 configured to couple with the shroud backing surface 141 of the body 130 of the shroud 100, a support sidewall 138 coupled with the base 137, and a support rail 139 coupled with the support sidewall 138. Each support 109 is formed of a nickel or cobalt based sheet metal and is coupled with the shroud 100 using tack-welds or alternate positioning techniques in preparation for metal braze operation to permanently bond/adhere each support 109 to the shroud backing surface 141. Additionally, each support 109 functions to retain the shroud 100 radially within the casing assembly ensuring the shroud 100 is coaxial with the rotating airfoil.

In one embodiment, the forward rail 133 of the shroud 100 has an anti-rotation device 140 integrally formed therein. The anti-rotation device 140 comprises a fixed base end 111, a resilient portion 110, and a free end 113 that comprises a tab 120. A base gap 119 having a predetermined shape, width and length separates the base end 111 of the anti-rotation device 140 from a first portion of the forward rail 133 that adjoins the sidewall 143. The base gap 119 serves to reduce the stresses at the base of the anti-rotation feature 140 to be within the material capability of the shroud 100. A second gap 117 of predetermined length and width extends from the base gap 119, substantially parallel a forward edge 107 of the forward rail 133, and past an end surface 121 of the free end 113 of the resilient portion 110. The second gap 117 separates the resilient portion 110 and free end 113 of the anti-rotation device 140 from a second portion of the forward rail 133 that adjoins the sidewall 143. Consequently, the resilient portion 110 is flexible and biased to return the free end 113 to the position shown in FIG. 1 if the free end 113 with the tab 120 and/or the resilient portion 110 are moved relative to the forward rail 133.

As shown in FIGS. 1, 2, 3, 4 and 4E, a third gap 115, or cut-out, separates the end surface 121 of the free end 113 of the resilient portion 110 from an adjacent third portion of the forward rail 133. The third gap 115 is dimensioned and configured to permit the free end 113 of the anti-rotation device 140 to move relative to the forward rail 133. In one embodiment, the third gap 115 is orthogonal to the second gap 117.

Additionally, the tab 120 protrudes outwardly from the shroud backing surface 141 of the forward rail 133 a predetermined distance. The tab 120 has an end surface 121 of a height equal, or about equal, to a thickness of the forward rail 133. Coupled with the end surface 121 is an angled surface 123, which slopes at a predetermined angle towards the base end 111. The angled surface 123 couples with a main surface 125. In turn, the main surface 125 couples with an orthogonal, or nearly orthogonal, projection surface 127, which couples with the resilient portion 110.

Figure 5:
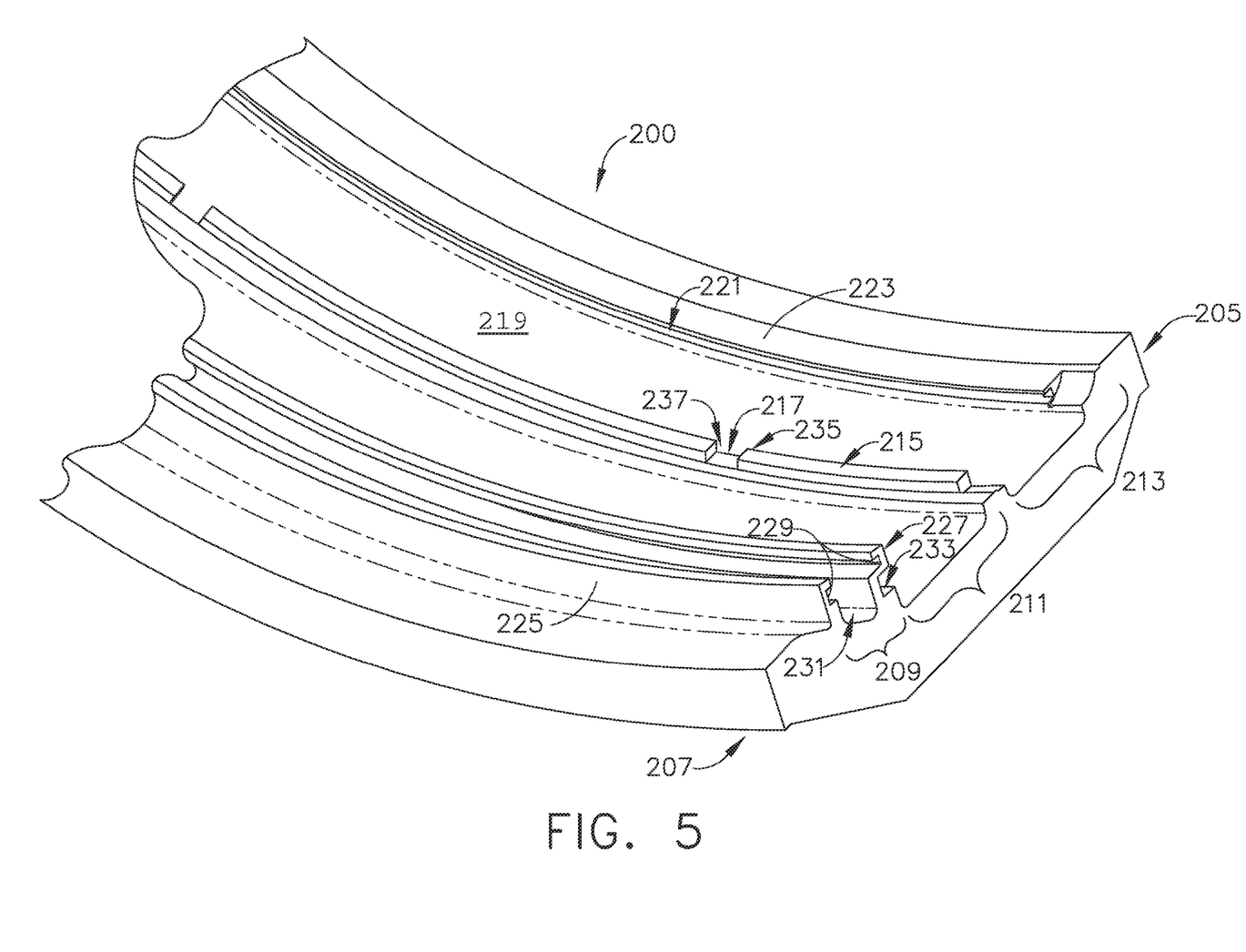
FIG. 5 is a perspective view of a section of an improved turbine case that is configured to couple with the improved turbine shroud of FIGS. 1, 4, 4A, 4B, 4C, 4D, and 4E.

FIG. 5 is a perspective view of a section of an improved split line turbine case 200 (hereinafter, "case 200") that is configured to couple with the improved turbine shroud 100 of FIGS. 1, 4, 4A, 4B, 4C, 4D, and 4E. Depending on the embodiment, the case 200 comprises a metal, a metal alloy, a composite material or a combination thereof. Referring to FIG. 5, although only a portion is shown for clarity and ease of illustration, the improved turbine case 200 is annular and is formed with at least 2 halves, of 180 degrees, where the axis of case 200 is collinear with the engine centerline and coaxial with the rotation of the airfoils. Additionally case 200 has a plurality of parallel grooves, channels and rails formed therein. For example, a first shroud groove 209, e.g., a first stage shroud groove 209, is formed adjacent and substantially parallel a forward edge 207 of the case 200. In one embodiment, the shroud groove 209 comprises a first rail 225, e.g., a forward rail 225, and a second rail 227, e.g., an aft rail 227, that are spaced apart to form a cavity 231 therebetween. Additionally, first channels 229 are formed in corresponding upper portions of the forward rail 225 and the aft rail 227. Additionally, the aft rail 227 comprises a second channel 233 formed in a lower portion thereof, below and on a side of the aft rail 227 opposite the first channels 229. The case 200 further comprises a third rail 215, e.g., a nozzle rail 215 that is positioned between and spaced apart from the aft rail 227 and a shroud ledge 223. In other words, the nozzle rail 215 is spaced aft and apart from the aft rail 227 and also spaced apart from and forward of the shroud ledge 223, as illustrated in FIG. 5. One or more notches 217 are formed in an upper portion of the nozzle rail 215. Each notch 217 has a first surface 235 positioned opposite a second surface 237. The first surface 235 is configured to engage at least the projection surface 127 of the tab 120 of the anti-rotation device 140 of FIGS. 1, 2, 3, 4, 4A, 4B, 4C, 4D and 4E. The second surface 237 is proximate, and may contact, the angled surface 123 of the tab 120 of the anti-rotation device 140 of FIGS. 1, 2, 3, 4, 4A, 4B, 4C, 4D and 4E during assembly and disassembly of a turbine engine.

The space between the aft rail 227 and the nozzle rail 215 forms a nozzle groove 211, for a second stage nozzle (not shown in FIG. 5). The space between the nozzle rail 215 and the shroud ledge 223 forms a second shroud groove 213, e.g., a second stage shroud groove 213. The second shroud groove 213 has a surface 219 that is positioned below an upper surface of the nozzle rail 215 and an upper surface of the shroud ledge 223. As illustrated, the shroud ledge 223 is adjacent and parallel to the aft portion 205 of the case 200, and includes a ledge 221 along its top, forward edge.

Figure 6:
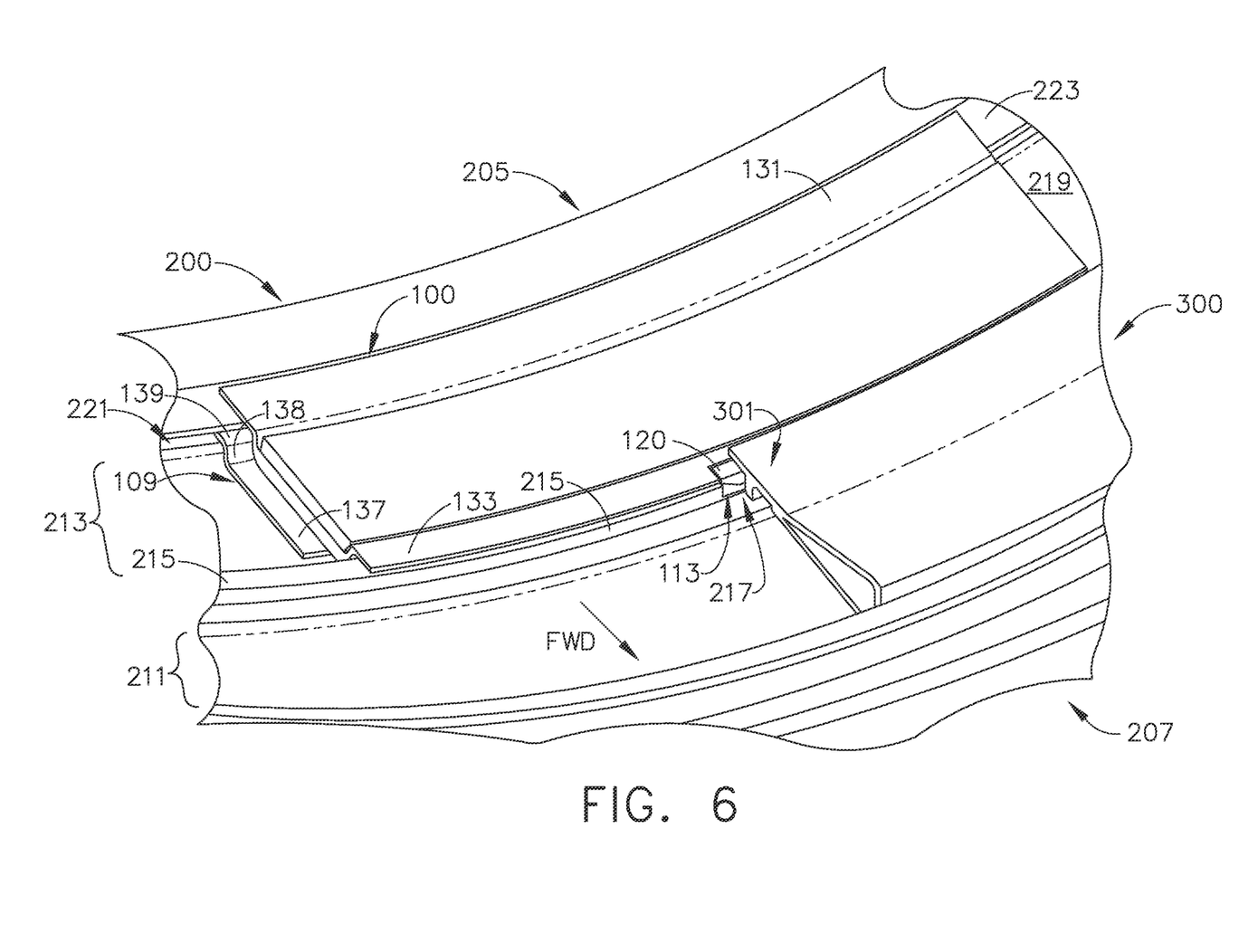
FIG. 6 is a perspective view of a section of the improved turbine case of FIG. 5 illustrating its coupling with the improved turbine shroud of FIGS. 1, 4, 4A, 4B, 4C, 4D and 4E and a second stage nozzle, a portion of which overlaps an anti-rotation device integrally formed with the improved turbine shroud.

FIG. 6 is a perspective view of a section of the improved turbine case 200 of FIG. 5 illustrating its coupling with the improved turbine shroud 100 of FIGS. 1, 4, 4A, 4B, 4C, 4D and 4E and a second stage nozzle 300, a portion 301 of which overlaps an embodiment of an anti-rotation device 140 integrally formed with the improved turbine shroud 100. The second stage nozzle 300 is positioned within the nozzle groove 211. As shown, when installed, the shroud 100 occupies the second shroud groove 213 of the case 200, with the shroud's aft rail 131 positioned proximate the aft portion 205 of the case 200 and the shroud's forward rail 133 positioned toward the forward portion 207 of the case 200. In particular, the shroud's aft rail 131 contacts the shroud ledge 223, and the shroud's forward rail 133 contacts the nozzle rail 215. The base 137 of the shroud's support strip 109 does not contact the surface 219 of the second shroud groove 213 and forms a gap/clearance/cavity with said surface. Moreover, the support rail 139 of the support strip 109 maintains a clearance fit with the ledge 221 formed along an upper, forward edge of the shroud ledge 223.

The resilient portion 110 (FIG. 1) is biased to mate, or couple, the tab 120 of the anti-rotation device 140 with the notch 217 formed in the nozzle rail 215 of the turbine case 200. Once installed as shown, the forward rail 133 of the shroud 100, including the anti-rotation device 140 (FIG. 1) and all its components, are overlapped by a portion 301, e.g. a nozzle overhang 301, of a second stage nozzle 300, which is positioned within the second stage nozzle groove 211. By overlapping the anti-rotation device 140, the nozzle overhang 301 prevents the tab 120 of the anti-rotation device 140 from disengaging the notch 217 formed in the nozzle rail 215. Accordingly, the coupling between the tab 120 of the anti-rotation device 140 and the notch 217 formed in the nozzle rail 215 of the case 200 prevents the shroud 100 from rotating during engine operation. However, removal of the second stage nozzle 300 during disassembly of the engine, uncovers the forward rail 133 of the shroud 100, including the anti-rotation device 140. Thereafter, circumferential rotation of the shroud 100 in a direction opposite that of normal airfoil rotation causes the second surface 237 (FIG. 5) of the notch 217 to contact the angled surface 123 (FIG. 5) of the tab 120 of the anti-rotation device 140 and raise the tab 120 of the anti-rotation device 140 up and out of the notch 217.

Figure 7:
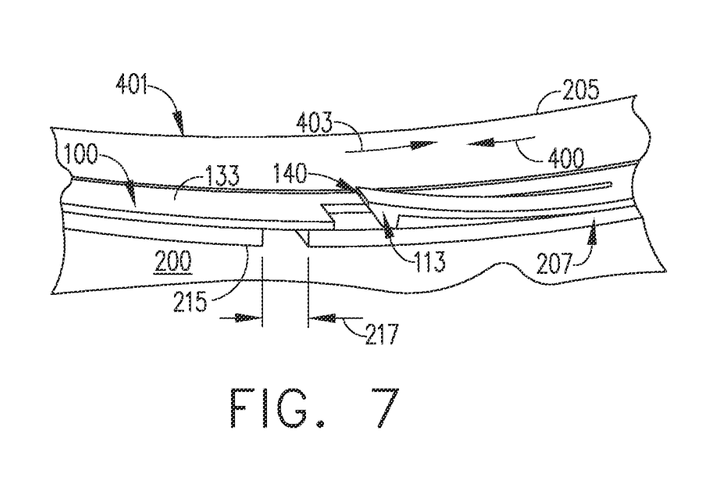
FIGS. 7, 8 and 9 are diagrams illustrating assembly of an embodiment of the improved turbine shroud of FIGS. 1, 4, 4A, 4B, 4C, 4D and 4E and engagement of the integrally formed anti-rotation device with a channel formed in an improved turbine case.
Figure 8:
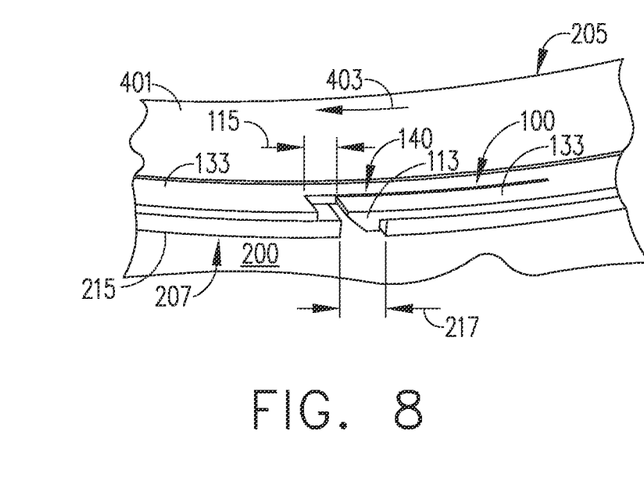
Figure 9:
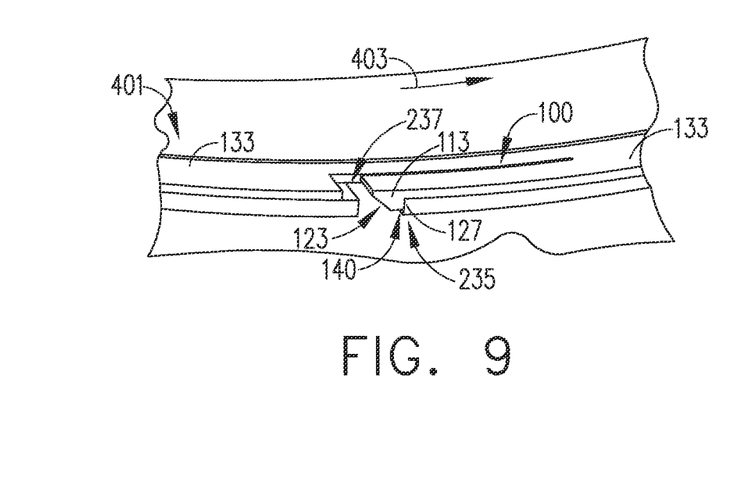

FIGS. 7, 8 and 9 are diagrams illustrating assembly of an embodiment of the improved turbine shroud 100 of FIGS. 1, 4, 4A, 4B, 4C, 4D and 4E and engagement of the integrally formed anti-rotation device 140 with a notch 217 formed in a nozzle rail 215 of an improved turbine case 200. In these Figures, angled lines aft of the nozzle rail 215 represent honeycomb core 103. Arrows 403 represent a direction of airfoil rotation during normal turbine engine operation. Arrow 400 indicates a direction of circumferential rotation of the shroud 100 during assembly and/or disassembly. Arrow 205 represents an aft portion of the turbine case 200, and arrow 207 represents a forward portion of the turbine case 200. In one embodiment, this direction of circumferential rotation 400 of the shroud 100 is opposite the direction of rotation 403 of the airfoil 401.

Beginning with FIG. 7, a turbine shroud 100 having a forward rail 133 that contacts a nozzle rail 215 of a turbine case 200 is circumferentially rotated in the direction of assembly represented by arrow 400 until, as shown in FIG. 8, the tab 120 of the anti-rotation device 140 fits within the notch 217 formed in the nozzle rail 215 and couples with a first surface 235 of the notch 217. As shown in FIG. 7, the free end 113 of the anti-rotation device 140 initially rests on an upper surface of the nozzle rail 215 and is thus biased up and away from the forward rail 133 and nozzle rail 215 to permit the main surface 125 and/or the angled surface 123 of the tab 120 of the anti-rotation device 140 to slide along the nozzle rail 215 in the turbine case 200 during assembly or disassembly. When the free end 113 of the anti-rotation device 140 is over the notch 217, spring action of the biased resilient portion 110 (FIG. 1) moves the tab 120 of the anti-rotation device 140 into the notch 217. Since the projection surface 127, e.g., load bearing surface 127, of the tab 120 is in the same direction of the rotating airfoil, the shroud 100 is considered to be anti-rotated. Thereafter, the nozzle (300 in FIG. 6) is assembled circumferentially after the shroud 100 is in place. An aft portion 301 of the nozzle 300 will overlap the flow path side of the anti-rotation device 140 thus preventing the tab 120 and/or the free end 113 of the anti-rotation device 140 from disengaging the notch 217.

When the tab 120 of the anti-rotation device 140 fits within the notch 217, the anti-rotation device 140 is parallel, or substantially parallel, the plane of the forward rail 133 of the shroud 100 and ready to be overlapped by a portion 301 (FIG. 6) of a nozzle 300 (FIG. 6). As shown in FIG. 9, vibrations and forces caused by normal rotation of the airfoil 401 tend to drive at least the projection surface 127 of the tab 120 of the anti-rotation device 140 and the first surface 235 of the notch 217 closer together. However, once the tab 120 of the anti-rotation device 140 and the first surface 235 of the notch 217 engage, further circumferential movement of the shroud 100 in the direction of airfoil rotation 403 stops.

Figure 10:
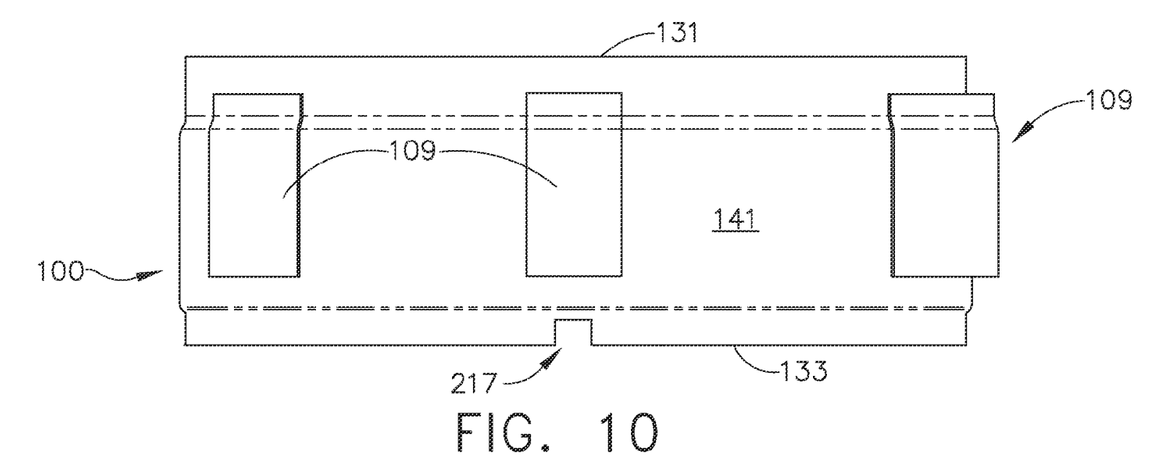
FIG. 10 is a plan view of an interior surface of a second embodiment of an improved turbine shroud.
Figure 11:
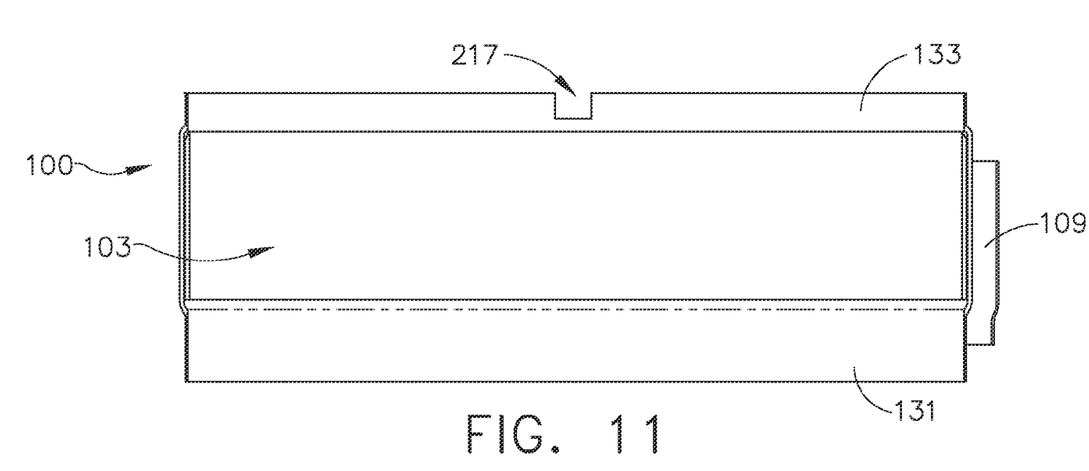
FIG. 11 is a plan view of a back surface of the second embodiment of the improved turbine shroud of FIG. 10.

FIG. 10 is a plan view of an interior surface of a second embodiment of an improved turbine shroud 100. FIG. 11 is a plan view of a back surface of the second embodiment of the improved turbine shroud of FIG. 10. Referring to FIGS. 10 and 11, this second embodiment is identical to that previously described above with respect to FIGS. 1, 2, 3, 4, 4A, 4B, 4C, 4D and 4E, except that the notch 217 that receives the tab 120 of the anti-rotation device 140 is formed in the forward rail 133, instead of in the rail 215 (FIG. 5) of the turbine case 200 (FIG. 5). The aft rail 131, support strips 109 and honeycomb 103 are the same as previously described.

Figure 12:
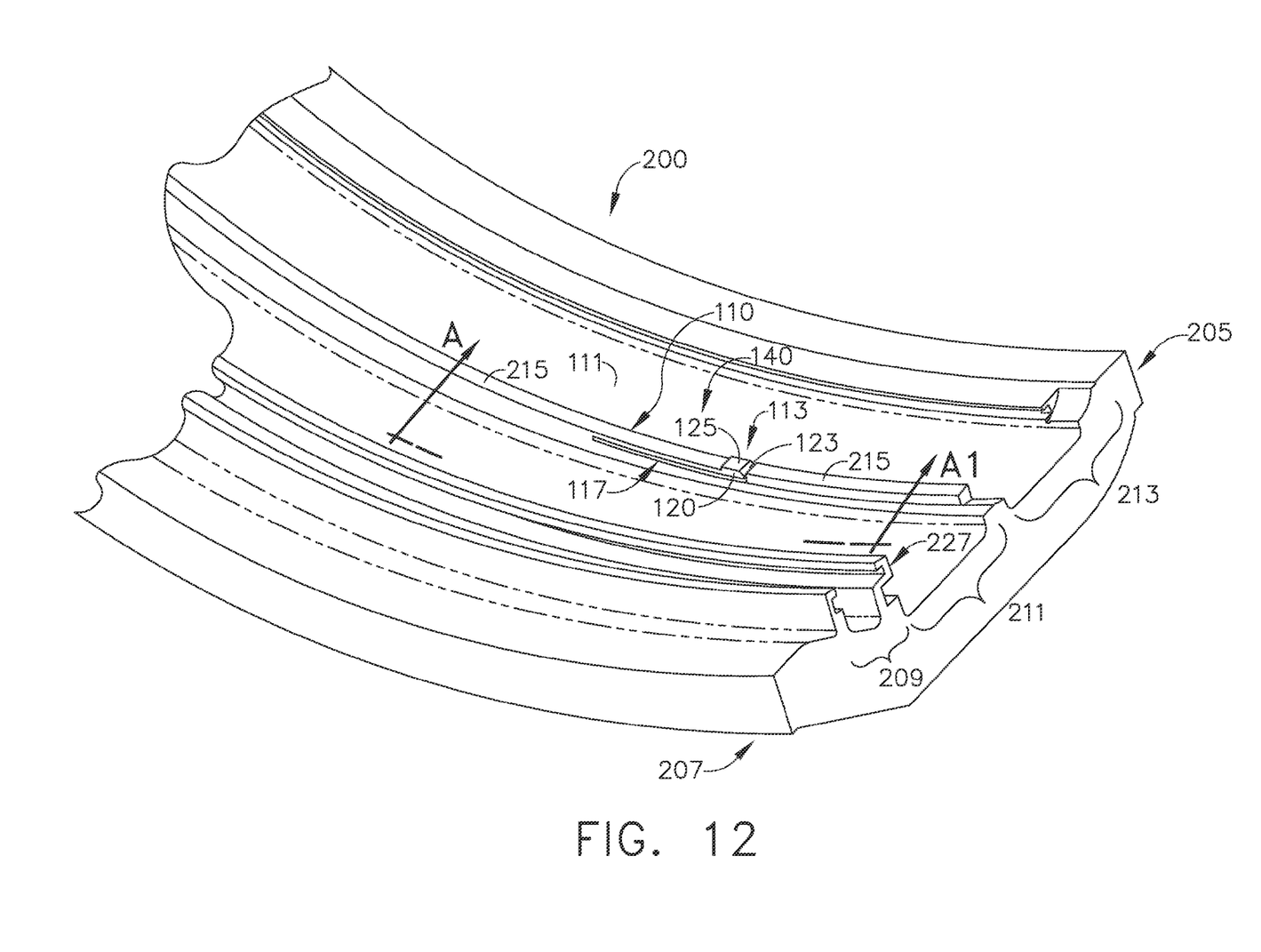
FIG. 12 is a perspective view of a section of another improved turbine case that is configured to couple with the improved turbine shroud of FIGS. 10 and 11.

FIG. 12 is a perspective view of a section of another improved split turbine case 200 that is configured to couple with the improved turbine shroud 100 of FIGS. 10 and 11. This second embodiment is identical to that previously described above with respect to FIG. 5, except that a portion of the rail 215 has an anti-rotation device 140, which includes the resilient portion 110. The resilient portion 110 is separated from the rail 215 by gap 117. The free end 113 of the resilient portion 110 includes the tab 120, which has an angled surface 123 and a main surface 127, as previously described. The aft portion 205, forward portion 207, aft rail 227, first stage shroud groove 209, second stage nozzle groove 211 and second stage shroud groove 213 are also as previously described.

Figure 13:
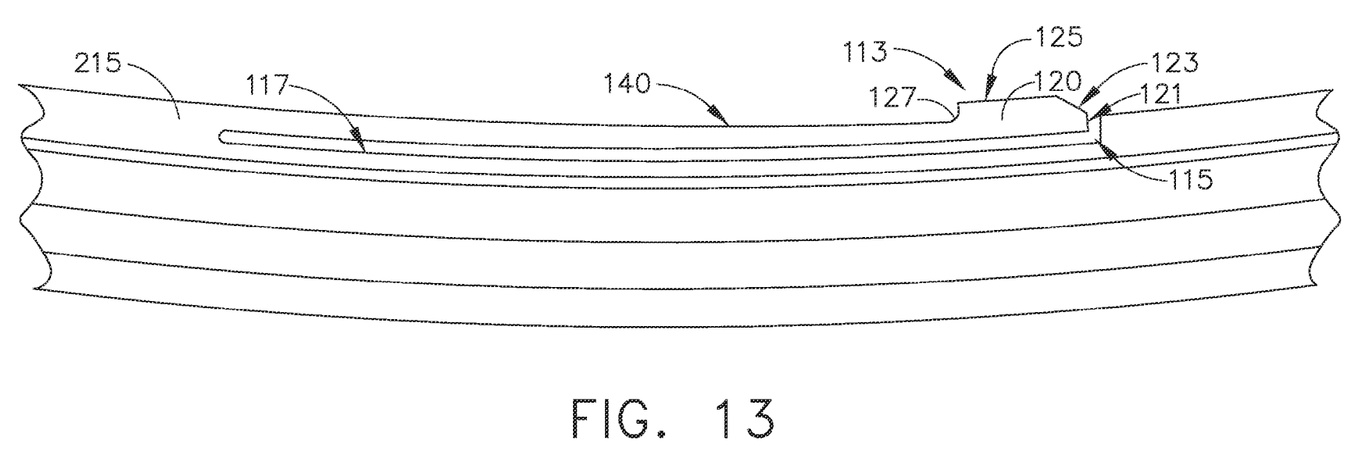
FIG. 13 is a cross-sectional view of a portion of the improved turbine case of FIG. 12, taken along the line A-A' in FIG. 12.

FIG. 13 is a cross-sectional view of a portion of the improved turbine case 200 of FIG. 12, taken along the line A-A' in FIG. 12, that further illustrates the second embodiment of the anti-rotation device 140 formed in the rail 215 of the improved turbine case 200. As shown in FIG. 13, the free end 113 of the resilient portion 110 includes the tab 120. The tab 120 includes the projection surface 127, which is coupled with the main surface 125. The main surface 125 is coupled with the angled surface 123. The angled surface 123 is coupled with the end surface 121. The end surface 121 is separated from an opposite portion of the rail 215 by the gap 115.

Figure 14:
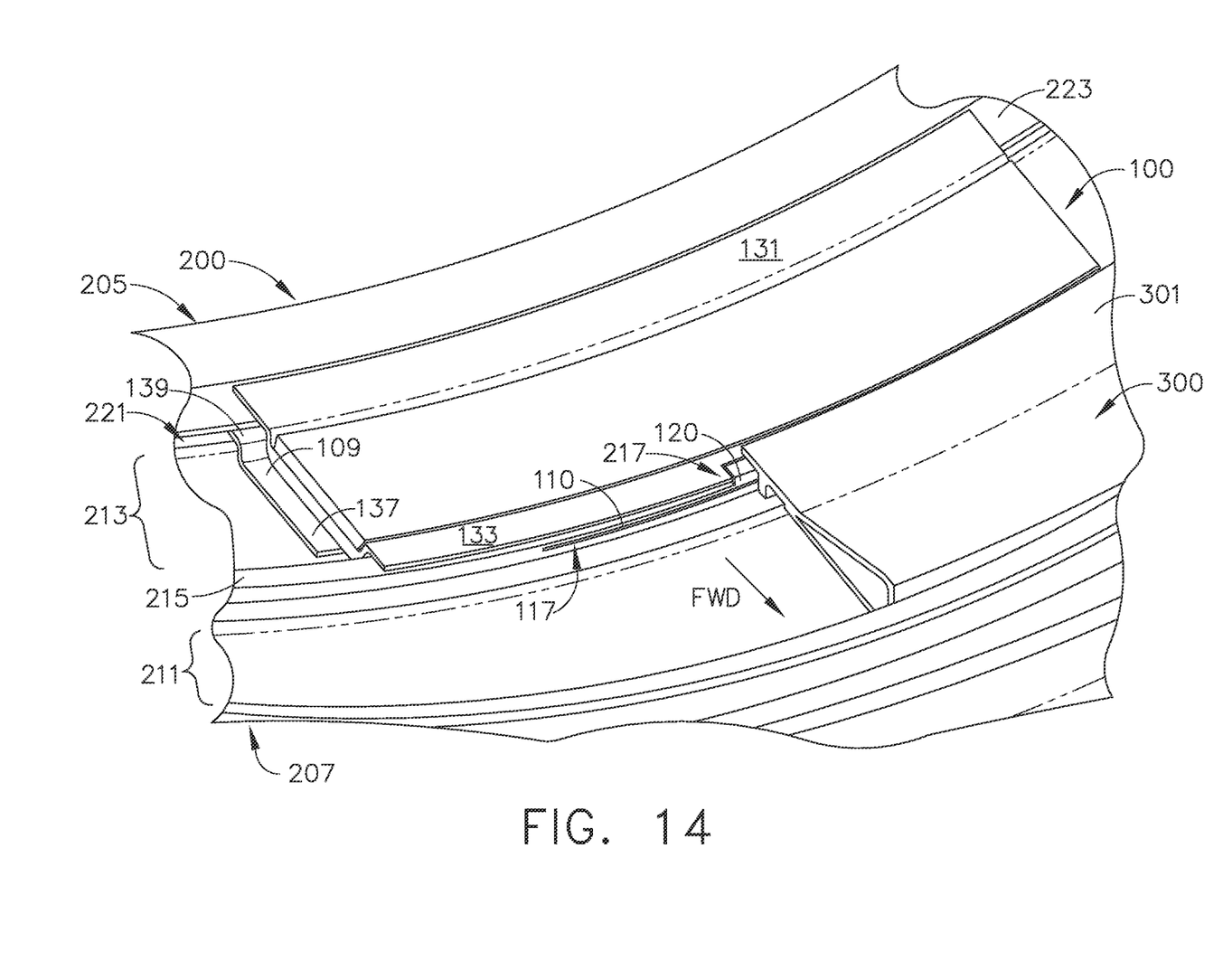
FIG. 14 is a perspective view of a section of the improved turbine case of FIG. 12 illustrating its coupling with the improved turbine shroud of FIGS. 10 and 11 and a second stage nozzle, a portion of which overlaps an anti-rotation device integrally formed with the improved turbine shroud.

FIG. 14 is a perspective view of a section of the improved split turbine case 200 of FIG. 12 illustrating its coupling with the improved turbine shroud 100 of FIGS. 10 and 11 and a second stage nozzle 300, a portion 301 of which overlaps the anti-rotation device 140 integrally formed with the rail 215 of the improved split turbine case 200. As shown, when installed, the shroud 100 occupies the second shroud groove 213 of the case 200, with the shroud's aft rail 131 positioned proximate the aft portion 205 of the case 200 and the shroud's forward rail 133 positioned toward the forward portion 207 of the case 200. In particular, the shroud's aft rail 131 contacts the shroud ledge 223, and the shroud's forward rail 133 contacts the nozzle rail 215. The base 137 of the shroud's support strip 109 does not contact the surface 219 of the second shroud groove 213 and forms a gap/clearance/cavity with said surface. Moreover, the support rail 139 of the support strip 109 maintains a clearance fit with the ledge 221 formed along an upper, forward edge of the shroud ledge 223.

The resilient portion 110 is biased to mate, or couple, the tab 120 of the anti-rotation device 140 with the notch 217 formed in the forward rail 133 of the shroud 100. Once installed as shown, the forward rail 133 of the shroud 100, including the anti-rotation device 140 (FIG. 1) and all its components, are overlapped by a portion 301, e.g. a nozzle overhang 301, of a second stage nozzle 300, which is positioned within the second stage nozzle groove 211. By overlapping the anti-rotation device 140, the nozzle overhang 301 prevents the tab 120 of the anti-rotation device 140 from disengaging the notch 217 formed in the forward rail 133 of the shroud 100. Accordingly, the coupling between the tab 120 of the anti-rotation device 140 and the notch 217 prevents the shroud 100 from rotating during engine operation. However, removal of the second stage nozzle 300 during disassembly of the engine, uncovers the forward rail 133 of the shroud 100, including the anti-rotation device 140. Thereafter, circumferential rotation of the shroud 100 in a direction opposite that of normal airfoil rotation causes a surface of the notch 217 to contact the angled surface 123 of the tab 120 of the anti-rotation device 140 and move the tab 120 of the anti-rotation device 140 out of the notch 217.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A split-line turbine case, comprising:
   a nozzle rail having a notch therein, the notch configured to receive a tab of an anti-rotation device formed on a portion of a turbine shroud; and
   a shroud ledge positioned proximate an aft portion of the turbine case and spaced apart from the nozzle rail to form a shroud groove therebetween, wherein the anti-rotation device comprises:
   a resilient portion extending from a base end and terminating in a free end, the resilient portion separated from the nozzle rail by a gap; and
   the tab formed at the free end and configured to fit within and couple with the notch.

2. A turbine shroud, comprising:
   a body having a forward rail and an aft rail; and
   an anti-rotation device integrally formed in a portion of the forward rail, wherein the anti-rotation device comprises;
   a base end coupled with the forward rail and separated from a first portion of the forward rail adjacent a sidewall of the turbine shroud by a first gap;
   a resilient portion extending from the base end and terminating in a free end, the resilient portion separated from second portion of the forward rail adjacent the sidewall by a second gap; and
   a tab formed at the free end and configured to fit within and couple with a notch formed in a nozzle rail of a split-line turbine case.

3. The turbine shroud of claim 2, wherein the tab further comprises:
   an end surface separated from an adjacent third portion of the forward rail by a third gap;
   an angled surface coupled with and extending from the end surface;
   a main surface coupled with and extending from the angled surface; and
   a projection surface coupled with and extending orthogonally between the resilient member and the main surface.

4. The turbine shroud of claim 3, wherein the second gap extends from the first gap past the free end and parallel a forward edge of the forward rail.

5. The turbine shroud of claim 3, wherein the third gap is orthogonal to the second gap.

6. A turbine shroud, comprising:
   an anti-rotation device having a resilient portion, the anti-rotation device oriented in a direction of turbine blade rotation to prevent rotation of the turbine shroud with respect to a split line turbine casing during engine operation, wherein the resilient portion extends from a base end and terminates in a free end, the resilient portion separated from a rail on the split line turbine casing by a gap, and a tab formed at the free end and configured to fit within and couple with a notch formed in a portion of the turbine shroud.

7. A split line turbine casing, comprising:
   a rail; and
   an anti-rotation device formed in the rail, wherein the anti-rotation device comprises:
   a resilient portion extending from a base end and terminating in a free end, the resilient portion separated from the rail by a gap; and
   a tab formed at the free end and configured to fit within and couple with a notch formed in a portion of a turbine shroud.

* * * * *

UNITED STATES PATENT AND TRADEMARK OFFICE
CERTIFICATE OF CORRECTION

| | | |
|---|---|---|
| PATENT NO. | : 8,684,674 B2 | Page 1 of 1 |
| APPLICATION NO. | : 12/915223 | |
| DATED | : April 1, 2014 | |
| INVENTOR(S) | : Chan et al. | |

It is certified that error appears in the above-identified patent and that said Letters Patent is hereby corrected as shown below:

In the Claims:

In Column 8, Line 13, in Claim 2, delete "comprises;" and insert -- comprises: --, therefor.

Signed and Sealed this
Fifteenth Day of July, 2014

Michelle K. Lee
*Deputy Director of the United States Patent and Trademark Office*